United States Patent
Trice et al.

(10) Patent No.: US 12,503,405 B2
(45) Date of Patent: Dec. 23, 2025

(54) METHODS OF PRODUCING CARBON/CARBON COMPOSITE PREFORMS AND CARBON/CARBON COMPOSITES FORMED THEREFROM

(71) Applicant: Purdue Research Foundation, West Lafayette, IN (US)

(72) Inventors: Rodney Wayne Trice, Xenia, OH (US); Edwin Sebastian Romero, West Lafayette, IN (US); Eduardo Barocio Vaca, West Lafayette, IN (US); Robert Byron Pipes, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 129 days.

(21) Appl. No.: 18/457,912

(22) Filed: Aug. 29, 2023

(65) Prior Publication Data
US 2024/0067575 A1 Feb. 29, 2024

Related U.S. Application Data

(60) Provisional application No. 63/401,841, filed on Aug. 29, 2022.

(51) Int. Cl.
| | | |
|---|---|---|
| *C04B 35/83* | (2006.01) | |
| *B33Y 10/00* | (2015.01) | |
| *B33Y 40/20* | (2020.01) | |
| *B33Y 70/10* | (2020.01) | |

(Continued)

(52) U.S. Cl.
CPC .............. *C04B 35/83* (2013.01); *B33Y 10/00* (2014.12); *B33Y 40/20* (2020.01); *B33Y 70/10* (2020.01); *C04B 35/62873* (2013.01); *C04B 35/64* (2013.01); *C04B 2235/422* (2013.01); *C04B 2235/48* (2013.01); *C04B 2235/5248* (2013.01); *C04B 2235/6021* (2013.01); *C04B 2235/6026* (2013.01); *C04B 2235/6562* (2013.01); *C04B 2235/661* (2013.01)

(58) Field of Classification Search
None
See application file for complete search history.

(56) References Cited

U.S. PATENT DOCUMENTS

| | | | | |
|---|---|---|---|---|
| 7,462,656 B2 * | 12/2008 | Keulen | ............ | H01B 1/24 523/210 |
| 2001/0003576 A1 * | 6/2001 | Klett | ............ | F16D 69/023 423/448 |

(Continued)

OTHER PUBLICATIONS

Ajinjeru, C. et al., "Rheological Survey of Carbon Fiber-Reinforced High-Temperature Thermoplastics for Big Area Additive Manufacturing Tooling Applications," Journal of Thermoplastic Composite Materials, (2019) pp. 1-19.

(Continued)

*Primary Examiner* — Joseph S Del Sole
(74) *Attorney, Agent, or Firm* — Hartman Global IP Law; Gary M. Hartman; Domenica N. S. Hartman

(57) ABSTRACT

Methods of manufacturing carbon/carbon preforms and carbon/carbon composites formed therefrom. Such a method includes extruding a polymer composite material using an extrusion deposition additive manufacturing process to form a preform, and heating the preform via pyrolysis to form the carbon/carbon composite.

20 Claims, 8 Drawing Sheets

(51) Int. Cl.
   *C04B 35/628* (2006.01)
   *C04B 35/64* (2006.01)

(56) References Cited

U.S. PATENT DOCUMENTS

| | | | | |
|---|---|---|---|---|
| 2007/0224235 | A1* | 9/2007 | Tenney | A61F 2/02 623/1.11 |
| 2015/0031522 | A1* | 1/2015 | La Forest | C04B 35/83 501/1 |
| 2015/0175750 | A1* | 6/2015 | Hopkins | C08L 83/00 524/588 |
| 2017/0096537 | A1* | 4/2017 | Fowler | C04B 35/83 |
| 2017/0183514 | A1* | 6/2017 | Benac | C08K 3/013 |
| 2017/0283330 | A1* | 10/2017 | Fryska | C23C 16/26 |
| 2020/0114545 | A1* | 4/2020 | Reese | B29B 17/0042 |
| 2021/0017089 | A1* | 1/2021 | Thrasher | B33Y 70/10 |

OTHER PUBLICATIONS

Ajinjeru, C. et al., "The influence of dynamic rheological properties on carbon fiber-reinforced polyetherimide for large-scale extrusion-based additive manufacturing," The International Journal of Advanced Manufacturing Technology (2018) 99, pp. 411-418.

Brenken, B. et al., "Development and Validation of Extrusion Deposition Additive Manufacturing Process Simulations," Additive Manufacturing, 25, (2019) pp. 218-226.

Brenken, B. et al., "Fused Filament Fabrication of Fiber-Reinforced Polymers: A Review," Additive Manufacturing, 21, (2018), pp. 1-16.

Fitzer, E. et al., "Carbon Reinforcements and Carbon/Carbon Composites," Springer-Verlag Berlin Heidelberg GmbH, Library of Congress Cataloging-in-Publication Data, Includes Bibliographical References and Index (1988), (353 pages).

Heller, B.P. et al., "Effects of Extrudate Swell and Nozzle Geometry on Fiber Orientation in Fused Filament Fabrication Nozzle Flow," Additive Manufacturing, 12, (2016), pp. 252-264.

Morgan, Peter., "Carbon Fibers and their Composites," Taylor & Francis Group, LLC., (2005), International Standard Book No. 13:978-1-4200-2874-4 (eBook—PDF), (1,174 pages).

Pibulchinda, P. et al., "Influence of Printing Conditions on the Extrudate Shape and Fiber Orientation in Extrusion Deposition Additive Manufacturing," Composites Part B, 261, (2023) (14 pages).

Ramirez, M.A. et al., "Temperature-Dependent Mechanical Properties of Additive Manufactured Carbon Fiber Reinforced Polyethersulfone," Applied Composite Materials (2022) pp. 2293-2319).

Savage, G., "Carbon-Carbon Composites," Springer-Science+Business Media, B.V., First Edition 1993, Originally Published by Chapman & Hall (393 pages).

Vaca, E.B., "Fusion Bonding of Fiber Reinforced Semi-Crystalline Polymers in Extrusion Deposition Additive Manufacturing," A Dissertation Submitted to the Faculty of Purdue University / In Partial Fulfillment of the Requirements for the Degree of Doctor of Philosophy, School of Materials Engineering, West Lafayette, Indiana, Dec. 2018, (379 pages).

Wedgewood, A., "Materials Development and Advanced Process Simulation for Additive Manufacturing with Fiber-Reinforced Thermoplastics," The Composites Institute, Final Technical Report IACMI/R003-2020/7.07, (117 pages).

Wu, H. et al., "Ablation Performance of 3D Printed Continuous Carbon Fiber-Reinforced PEEK Composites," AIAA SciTech Forum, 11-15 & 19-21 Jan. 2021, Virtual Event, AIAA Scitech 2021 Forum, Copyright 2021, Published by the American Institute of Aeronautics and Astronautics, Inc., with permission (pp. 1-13).

Wu, H. et al., "Multi-Functional ULTEM™ 1010 Composite Filaments for Additive Manufacturing Using Fused Filament Fabrication (FFF)," Additive Manufacturing, 24, (2018) pp. 298-306.

Xu, Y., et al., "Three Dimensional Printing of Carbon/Carbon Composites by Selective Laser Sintering," Carbon, 96, (2016) pp. 603-607.

Yan, J. et al., "Extrusion Width Critically Affects Fibre Orientation in Short Fibre Reinforced Material Extrusion Additive Manufacturing," Additive Manufacturing, 49, (2022) (12 pages).

Yan, M. et al., "High Temperature Rheological Behavior and Sintering Kinetics of CF/PEEK Composites During Selective Laser Sintering," Composites Science and Technology, 165, (2018) pp. 140-147.

* cited by examiner

| Composite Material | Screw Zone 1, 2, 3 Temperature (°C) | Extruder Nozzle Temperature (°C) | Print Bed Temperature (°C) |
|---|---|---|---|
| 50CF-PPS | 276, 293, 301 | 300 | 120 |
| 50CF-PPS_C | 326, 387, 387 | 300 | 140 |
| 40CF-PPS | 276, 293, 301 | 300 | 120 |
| 40CF-PPS_C | 326, 387, 387 | 300 | 140 |
| 40CF-PEI | 370, 380, 390 | 395 | 150 |
| 30CF-PEEK | 360, 390, 390 | 390 | 140 |
| 25CF-PSU | 288, 316, 354 | 357 | 140 |
| 25CF-PESU | 305, 330, 360 | 360 | 120 |
| 20CF-PEI | 305, 330, 360 | 360 | 140 |

| Property | Value |
|---|---|
| Screw Diameter | 25.4 mm |
| Screw Length/Diameter ratio | 24 |
| Extruder Nozzle Diameter | 4 mm |
| Bead Width, $w$ | 6.15 mm |
| Bead Height, $h$ | 1.5 mm |

FIG. 2: Table 1

| Composite Material | Composite Pellet Char Yield, $Y_c$ (%) | Fiber Char Yield, $Y_f$ (%) | Polymer Char Yield, $Y_m$ (%) | Temperature at Onset of Decomposition (°C) |
|---|---|---|---|---|
| 50CF-PPS | 70.6 | 98.4 | 42.9 | 472.0 |
| 50CF-PPS C | 66.1 | 98.4 | 33.9 | 477.7 |
| 40CF-PPS | 68.8 | 98.4 | 49.1 | 484.6 |
| 40CF-PPS C | 66.3 | 98.4 | 44.9 | 505.7 |
| 40CF-PEI | 71.8 | 98.4 | 54.1 | 512.9 |
| 30CF-PEEK | 64.9 | 98.4 | 50.6 | 564.1 |
| 25CF-PSU | 51.3 | 98.4 | 35.6 | 511.4 |
| 25CF-PESU | 54.8 | 98.4 | 40.3 | 543.6 |
| 20CF-PEI | 65.2 | 98.4 | 56.9 | 522.9 |

FIG. 5: Table 2

| Composite Material | Before Pyrolysis | Density (g/cm³) After Pyrolysis at 5°C/min | After Pyrolysis at 1°C/min |
|---|---|---|---|
| 50CF-PPS | 1.51 | 0.67 | 0.81 |
| 40CF-PPS | 1.47 | 0.63 | 0.72 |
| 40CF-PEI | 1.43 | 0.56 | 0.67 |
| 30CF-PEEK | 1.40 | 0.49 | 0.51 |
| 25CF-PSU | 1.39 | 0.18 | 0.27 |
| 25CF-PESU | 1.46 | 0.59 | 0.64 |
| 20CF-PEI | 1.34 | 0.22 | 0.35 |

FIG. 7: Table 3

METHODS OF PRODUCING CARBON/CARBON COMPOSITE PREFORMS AND CARBON/CARBON COMPOSITES FORMED THEREFROM

CROSS-REFERENCE TO RELATED APPLICATIONS

This application claims the benefit of U.S. Provisional Application No. 63/401,841 filed Aug. 29, 2022, the contents of which are incorporated herein by reference.

STATEMENT REGARDING FEDERALLY SPONSORED RESEARCH OR DEVELOPMENT

This invention was made with government support under FA8650-20-2-2405 awarded by the Air Force Research Laboratory (AFRL). The government has certain rights in the invention.

BACKGROUND OF THE INVENTION

The present invention generally relates to carbon/carbon composite preforms formed thereby, and particularly relates to methods of manufacturing carbon/carbon preforms, such as by extrusion deposition additive manufacturing (EDAM) methods, and carbon/carbon composites formed therefrom.

Hypersonic vehicle development is an emerging technology where development of hot primary structures, particularly composite structures, is critical. At Mach 5 and greater speeds, convective heat from hot, chemically reacting flow sheathing on surfaces of a hypersonic vehicle can generate wall temperatures in excess of 1800° C. Such a harsh aerothermodynamic environment cannot only be difficult to model and replicate in ground test facilities, necessitating demand for expensive flight tests to obtain experimental data, but also introduces several thermo-structural challenges for vehicles designed to have cold primary structures. While active and semi-passive thermal protection systems can and have been used to keep primary structures at acceptably low temperatures, they can complicate vehicle design, such as mitigating strain mismatch of multi-material assemblies (insulation, thermal protection system, structure, etc.) arising from large thermal gradients to prevent gaps in the structure and ingress of, and structural damage from, potentially ionized flow. Designing with hot primary structural materials such as ceramic matrix composites (CMCs) and carbon/carbon (C/C) composites can simplify design if small- and large-scale structural prototypes with complex geometries can be developed inexpensively to accelerate experimental research and part production for in-service applications.

C/C composites encompass carbon matrices reinforced with carbon fibers, and are an attractive class of materials for hypersonic flight applications due to their high thermal conductivity and high specific strength at temperatures above 3000° C. in non-oxidizing atmospheres. Developed for ablative use and for special aerospace applications including rocket nozzles and atmospheric reentry vehicles, C/C composites are also used in the aviation, automotive, power generation, and furnace construction industries for production of brake discs and brake pads, high-temperature racks, heating elements, high-temperature fasteners, and furnace liners. Although C/C composites have an extensive history of success as a high temperature material, their manufacturing can increase costs for hypersonic flight applications, especially during experimental research where there may be successive design iterations to the vehicle geometry or structure in order to optimize performance. C/C composite manufacturing processes generally start with a preform production step, where carbon fibers are oriented into one- or multi-dimensional fiber architectures and bonded with a carbonaceous polymer or binder. The resulting carbon fiber-reinforced polymer (CFRP) preform is then thermally decomposed in a non-oxidizing environment (pyrolysis) at temperatures of approximately 1000° C. to convert the polymer into carbon. Because conversion of the polymer to carbon results in weight loss and the formation of a porous carbon matrix structure, the resulting C/C composite is taken through several infiltration and pyrolysis cycles with either a carbonaceous polymer (polymer infiltration and pyrolysis, PIP) or vapor (chemical vapor infiltration, CVI) to reduce porosity and obtain suitably dense parts, followed by graphitization to increase the degree of covalent bond alignment and further improve the thermomechanical properties of the material. While the manufacturing costs associated with densification and long furnace residence times of C/C composites have been reduced with the development of high char-yielding polymers such as polyarylacetylene (PAA) and bis-ortho-diynylarene (BODA), the manufacturing costs associated with fiber orientation and part geometry during preform production remain current challenges.

Fiber orientation is an important parameter in meeting strength and shape requirements for high temperature composites since it dictates many of the engineering properties in the composite, including transport and mechanical properties. CFRP preforms are conventionally manufactured via filament winding, resin transfer molding, and autoclave curing. Hand layups and textile techniques such as braiding, stitching, knitting, and weaving have also been conventional manufacturing methods of multi-directional fiber-reinforced preforms, but their laboriousness/complexity in preform processing and lack of automation have hindered their development.

Several fabrication challenges associated with the geometry of C/C composites, as well as CMCs, can be addressed with additive manufacturing (AM). As known in the art, AM is a manufacturing approach whereby components are made layer-by-layer according to a computer-aided design (CAD) model, enabling greater design flexibility in creating near-net shape parts that minimize component assembly/post-processing machining, cost reductions for small batch manufacturing, material waste savings, and designs for more engineering-efficient structures. Several AM methods have been successfully used to manufacture CMCs and C/C composites with complex geometries, including selective laser sintering (SLS), stereolithography (SLA), and direct ink writing (DIW), but present challenges for orienting fibers and/or scaling.

As known in the art, SLS involves selectively sintering powders into parts. While advantages of SLS include fast build speeds, dimensional accuracy, and avoiding binder burnout/pyrolysis in the case of CMCs, achieving uniform dispersions via mixing of the carbon fibers with ceramic powder or carbon matrix powder precursors makes it difficult to preferentially orient fibers in load-critical directions. The laser power can also critically affect the formation of the microstructure and the resulting mechanical properties of the composite, where a high-power laser has been shown to favorably increase the percent of open porosity but simultaneously decrease the mechanical strength of the final part.

SLA is an AM method that also provides high resolution and dimensional accuracy of printed parts, but differs from SLS in that it uses a light source, typically in the ultraviolet (UV) wavelength range, to cure a photopolymerizable monomer into complex shapes. SLA however, also relies on mixing techniques to disperse carbon fibers, and because of their absorption and light scattering properties, the fibers can reduce the UV cure depth during manufacturing, which can prolong manufacturing times for large-scale structures.

Automated tape layup (ATL) and automated fiber placement (AFP) are additional AM methods that have become widely adopted in industry. Developed initially as a means of automating traditional hand layup processes, ATL/AFP are well-suited for orienting carbon fibers and differ primarily in the width of the material that is laid down. AFP utilizes tows instead of wide tapes used in ATL, facilitating layup of more complex shapes. Despite being relatively mature processes, the use of molds by ATL/AFP introduces scalability issues compared to mold-free AM methods and limits their ability to manufacture certain geometries, such as lattice-type structures.

Extrusion-based AM methods such as DIW and extrusion deposition additive manufacturing (EDAM) are, by contrast, mold-free methods and can more easily orient fibers by controlling deposition conditions of fiber-reinforced viscoelastic materials, making them attractive for tailoring the microstructure and mechanical properties of composite materials. DIW differs from EDAM in that it can achieve material extrusion at room temperature, relying more on the rheological properties than heat to flow and deposit material. Because of its method of fabrication, DIW depends considerably on thermosetting and thermoplastic polymers with a variety of additives to initiate chemical and/or physical cross-links between deposited layers and create free-standing structures with high dimensional accuracies. While this makes future-prospects of DIW promising for a broad class of materials, the additives can generate additional voids and cracks during binder burnout/pyrolysis, and must be extremely fine-tuned for every material in order to deposit layers that can support the weight of subsequent layers above it, which is still being investigated in order to manufacture large-scale structures. By comparison, EDAM uses heat to flow and deposit a fiber-reinforced material, such as high performance thermoplastic polymers that solidify at room temperature to create free-standing structures. While EDAM has seen significant advancements for commercialization, seen most noticeably with the development of large-scale additive manufacturing (LSAM) and big area additive manufacturing (BAAM) systems. Though the use of heat by EDAM to flow and deposit fiber-reinforced materials can lead to undesirable residual stresses and part deformation, EDAM has been successfully modeled and simulated to produce parts with high dimensional accuracies. While DIW has been used to manufacture high temperature composites, EDAM has not.

In view of the above, it would be desirable if methods were available for manufacturing carbon/carbon preforms that are capable of at least partly overcoming or avoiding problems, shortcomings or disadvantages noted above.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, methods of manufacturing carbon/carbon preforms and carbon/carbon composites formed therefrom.

According to a nonlimiting aspect of the invention, a method of manufacturing a carbon/carbon composite includes extruding a polymer composite material using an extrusion deposition additive manufacturing process to form a preform, and heating the preform via pyrolysis to form the carbon/carbon composite.

Technical aspects of methods having features as described above preferably include the capability of manufacturing complex preforms to yield complex-shaped C/C composites.

Other aspects and advantages will be appreciated from the following detailed description as well as any drawings.

BRIEF DESCRIPTION OF THE DRAWINGS

FIG. 2 contains Table 1, which identifies certain extrusion system parameters used during an experimental 3D printing operation by which carbon fiber-reinforced thermoplastic polymer materials were used to produce preforms in the shape of panels.

FIG. 5 contains Table 2, which identifies constituent char yields and polymer onsets of decomposition from pyrolysis of the pellets of the carbon fiber-reinforced thermoplastic polymer materials.

FIG. 7 contains Table 3, which identifies densities of coupons before and after pyrolysis at 5° C./min and 1° C./min.

DETAILED DESCRIPTION OF THE INVENTION

Figure 1:
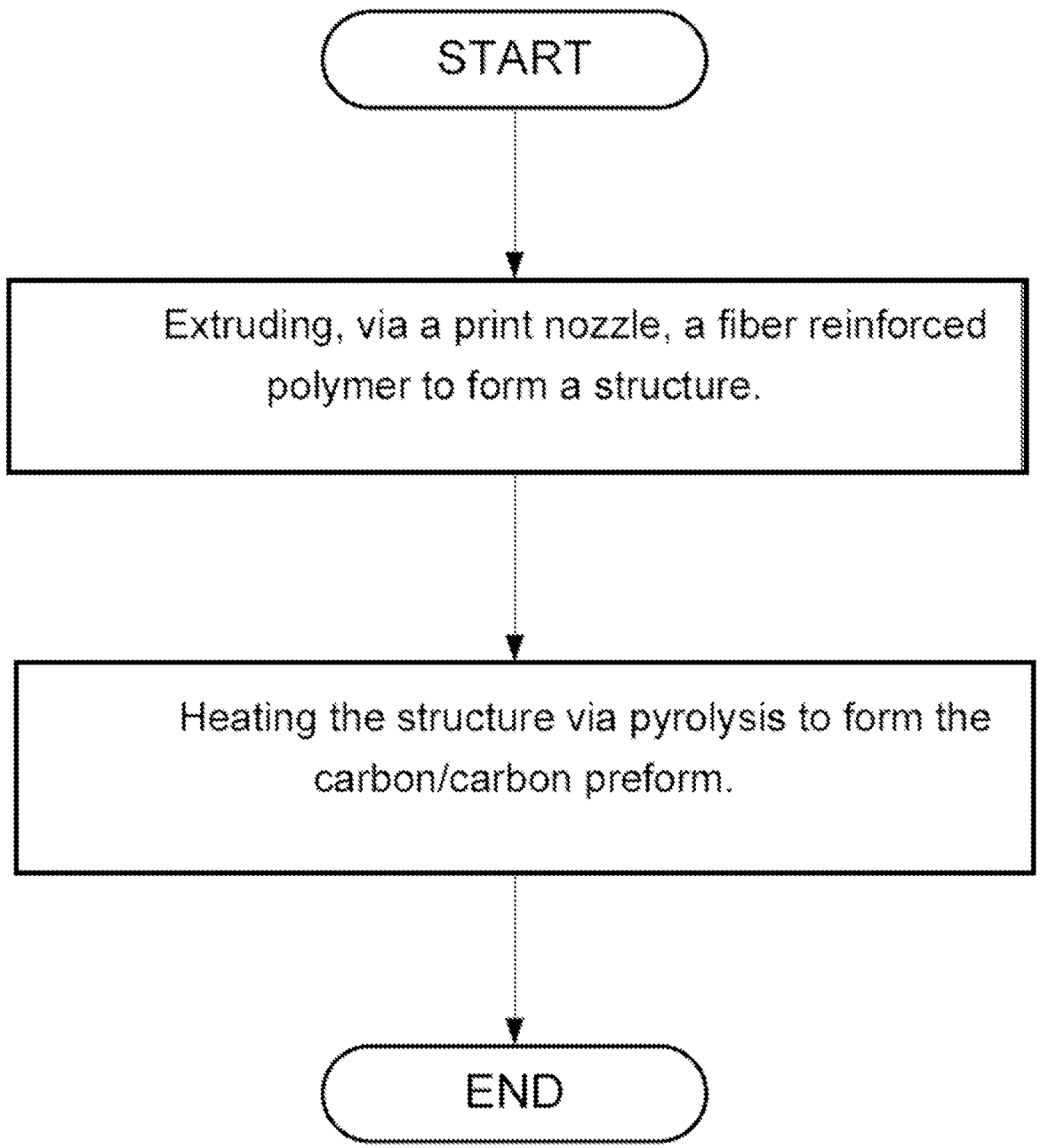
FIG. 1 contains a flow diagram illustrating a nonlimiting example of a method capable of manufacturing carbon/carbon preforms and includes a 3D printing operation in accordance with the invention.

The intended purpose of the following detailed description of the invention and the phraseology and terminology employed therein is to describe what is shown in the drawings, which include the depiction of and/or relate to one or more nonlimiting embodiments of the invention, and to describe certain but not all aspects of what is depicted in the drawings, including embodiment(s) to which the drawings relate. The following detailed description also describes certain investigations relating to the embodiment(s), and identifies certain but not all alternatives of the embodiment(s). As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

The following describes methods of manufacturing carbon fiber-reinforced composites using EDAM processes that are preferably capable of yielding complex-shaped C/C composites. The EDAM processes included the passing of pelletized feedstock materials through a single-screw extruder, wherein the pelletized feedstock materials comprised a carbon fiber-reinforced thermoplastic polymer material that was primarily melted by viscous heat losses. The resulting melted feedstock material then flowed into a melt pump that was capable of providing flow rate control during three-dimensional (3D) printing. The melted feedstock material then flowed through a nozzle of a 3D printer such that the suspended carbon fibers in the flow were dominantly oriented along the print direction via shear flow. By following a prescribed print path and speed set via computer software, the 3D printer deposited the molten feedstock material with oriented fibers on a print bed layer by layer to form complex geometries.

High-performance polymers capable of use in EDAM preferably differ from engineering plastics and standard plastics in terms of their superior temperature stability, mechanical properties, and chemical resistance. The replacement of aliphatic carbon backbones in early thermoplastics with aromatic backbones in newer thermoplastics increases intermolecular forces and yields thermomechanical properties and solvent resistances that often exceed thermosets.

The following describes investigations that evaluated an EDAM process to produce C/C composites using pelletized feedstock materials (hereinafter, "pellets") comprising carbon fiber-reinforced thermoplastic polymer materials (hereinafter, "polymer composite materials) containing carbon fibers dispersed in a thermoplastic polymer. The evaluated thermoplastic polymers were polyphenylene sulfide (PPS), poly sulfone (PSU), polyetheretherketone (PEEK), polyether sulfone (PESU), and polyetherimide (PEI). The evaluations utilized thermogravimetric analysis (TGA) and coupon distortion tests to compare polymer char yields and dimensional stabilities during pyrolysis. The TGA and coupon distortion results were used to determine if a more complex shape formed by a polymer composite material could be thermally decomposed into a complex-shaped C/C composite without significantly distorting the printed geometry. While PPS and PEEK are semicrystalline thermoplastics, PEI, PSU, and PESU are amorphous thermoplastics. The only additive known in the pellets was the filler/fiber loading.

A fiber (hereinafter "neat fiber") used in the investigations was commercially obtained from Hexcel under the name AS4-GP3K. The polymer composite materials were as follows. A 50 wt. % fiber loaded PPS (hereinafter "50CF-PPS") was commercially obtained from Techmer under the name Electrafil PPS CF50 HS DP. A second 50 wt. % fiber loaded PPS (hereinafter "50CF-PPS C") was commercially obtained from Celanese under the name Celstran PPS-CF 50-01. A 40 wt. % fiber loaded PPS (hereinafter "40CF-PPS") was commercially obtained from Techmer under the name Electrafil PPS CF40 HS DP. A second 40 wt. % fiber loaded PPS (hereinafter "40CF-PPS C") was commercially obtained from Celanese under the name Celstran PPS-CF 40-01. A 40 wt. % fiber loaded PEI (hereinafter "40CF-PEI" was commercially obtained from Sabic under the name LNP Thermocomp AM Compound EC008APQ. A 30 wt. % fiber loaded PEEK (hereinafter "30CF-PEEK") was commercially obtained from Evonik under the name Vestakeep 2000 CF30. A 25 wt. % fiber loaded PSU (hereinafter "25CF-PSU") was commercially obtained from Techmer under the name Electrafil PSU CF25 HS 3DP. A 25 wt. % fiber loaded PESU (hereinafter "25CF-PESU") was commercially obtained from Techmer under the name Electrafil PESU CF25 HS 3DP. A 20 wt. % fiber loaded PEI (hereinafter "20CF-PEI") was commercially obtained from Sabic under the name LNP Thermocomp AM Compound EC004EXAR1.

Thermogravimetric analysis tests were conducted on composite pellets of the polymer composite materials to determine which thermally decomposed thermoplastic polymers might exhibit high char yields following pyrolysis, since a higher char yield would indicate less resulting porosity. To distinguish between fiber char yields and polymer char yields in the pellets, a TGA test was also conducted on a tow segment of neat fiber for an estimate of the weight loss from the fibers and/or fiber sizing in the pellets. The sample masses during TGA were 76±1 mg for all materials. A TGA furnace was equilibrated at 120° C. in an air atmosphere and held isothermally for about sixty minutes to evaporate any absorbed moisture. The furnace temperature was then decreased to about 25° C. where a gas switch to nitrogen was made at a flow rate of 10 mL/min. To simulate pyrolysis using the TGA, the furnace was ramped at about 5° C./min from about 25° C. to 900° C. in a nitrogen atmosphere then decreased to about 25° C. Because of the number of materials tested, the thermogravimetric analyzer was again ramped at about 5° C./min to about 200° C. in an air atmosphere to ensure thermocouple readings were accurate for the following test. Equation 1 was used to calculate the polymer char yields from the composite pellet char yields.

$$Y_m = \frac{Y_c - w_{f,i}Y_f}{w_{m,i}} \qquad (1)$$

$Y_m$ (%) is the polymer char yield, $Y_c$ (%) is the composite pellet char yield, $W_{f,i}$ (%) is the initial fiber weight fraction, $Y_f$ (%) was the fiber char yield, and $W_{m,i}$ (%) is the initial weight fraction of the thermoplastic polymer. Equation 1 was derived using the principle of mass conservation. In Equation 1, the initial weight fractions of fiber and thermoplastic polymer were known while the char yield values, $Y_c$ and $Y_f$, were found after thermogravimetric analysis. The data was analyzed using Universal Analysis software.

Figure 3:
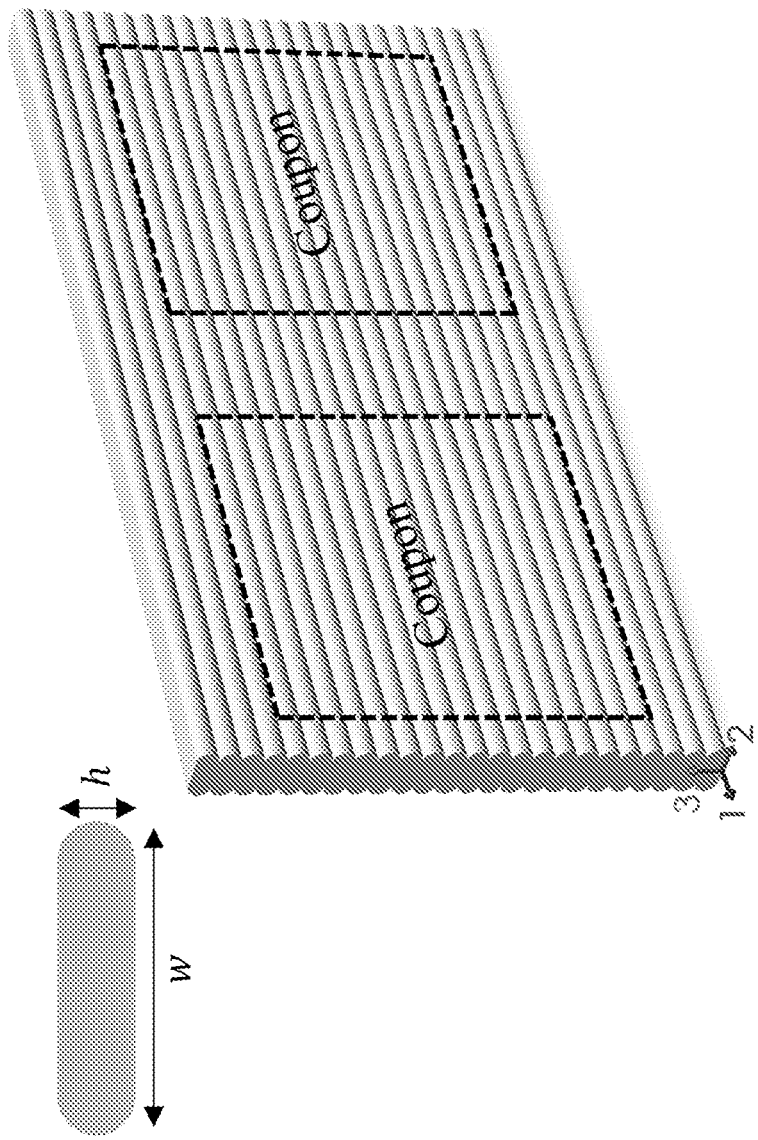
FIG. 3 schematically represents a 3D printed vertical panel of a type produced by the experimental 3D printing operation and from which coupons were obtained for pyrolysis processing.

For the investigations, preforms in the shape of panels were additively manufactured using an extrusion deposition system configured for 3D printing. Process conditions such as drying time, screw zone(s), extruder nozzle, and print bed temperatures used were set according to the material manufacturers process sheets, and temperatures are summarized in Table 1 contained in FIG. 2. The screw length/diameter ratio used, the extruder nozzle size, and the bead dimensions used for printing the specimens are also listed in Table 1. The extruder nozzle speed used for all materials was 5000 mm/min. FIG. 3 schematically represents an example panel that was additively manufactured and indicates coupons of about 25.4 mm×25.4 mm in size as being cut from the panel.

Distortion tests were performed on coupons cut from the panels to determine if any of the evaluated polymer composite materials could maintain their size and shape during pyrolysis processing despite thermal decomposition as a result of isothermally heating the preforms above the glass transition temperatures of the thermoplastic polymers. Within an alumina dee tube, constant heating rates of about 1° C./min and about 5° C./min were used from about 25° C. to about 900° C., and a heating rate of about 1° C./min was used from about 900° C. to about 25° C. High purity nitrogen was passed through a tube furnace rated for 1200° C. at a rate of about 10 mL/min, where the furnace temperatures were monitored. The alumina tube had an inner diameter of about 92.075 mm and an outer diameter of about 101.6 mm. Equation 2 was used to calculate the strains of the coupons after carbonization, $$\varepsilon = \frac{\Delta L}{L_0} \quad (2)$$

where $\Delta L$ (mm) is the change in length of the coupons after pyrolysis, and $L_0$ (mm) is the initial length of the coupons before pyrolysis. The coupon densities before and after pyrolysis were found via Equation 3, $$\rho = m/V \quad (3)$$

where $\rho$ (g/cm$^3$) is the coupon density, m(g) is the coupon mass, and V (cm$^3$) is the coupon volume.

Figure 4:
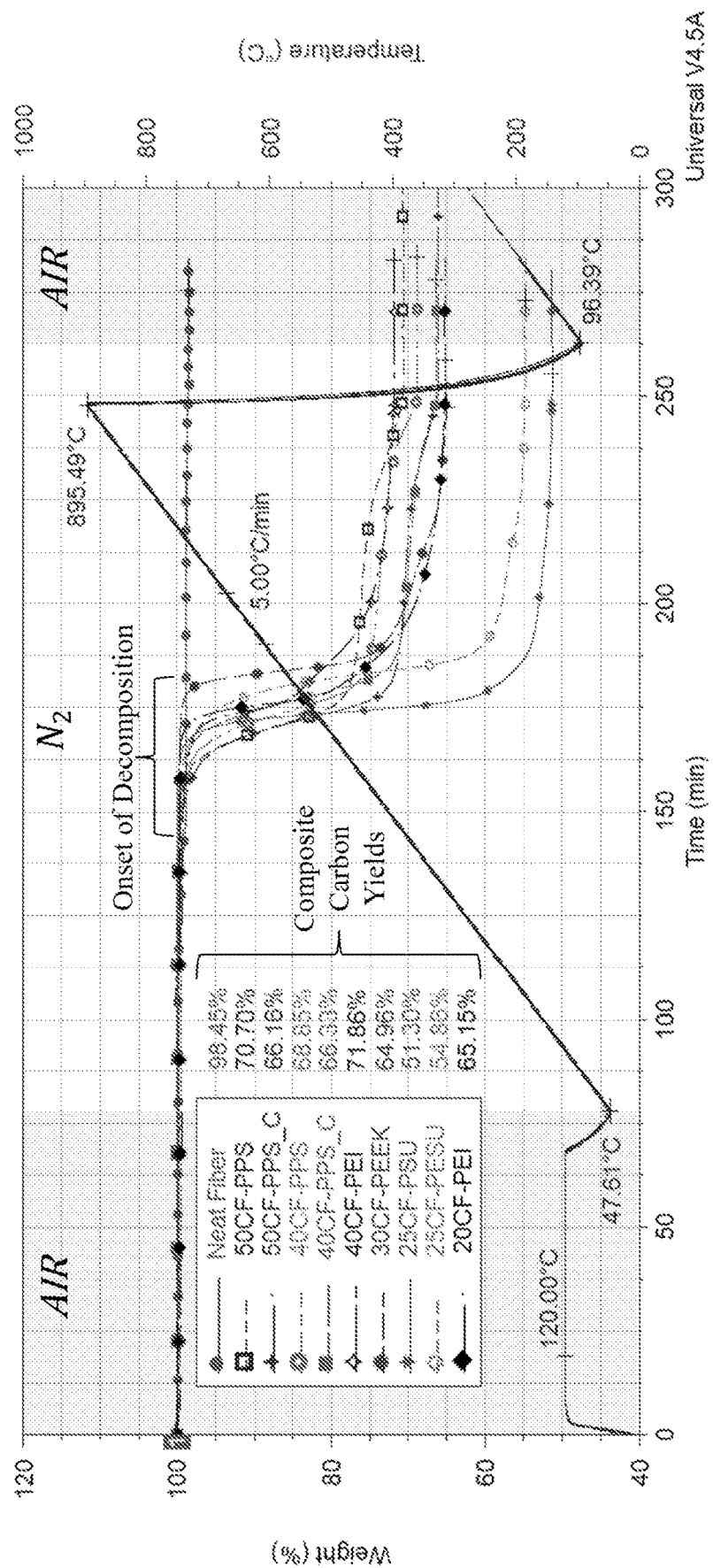
FIG. 4 contains a graph plotting fractional weight loss versus time during pyrolysis of pellets of the carbon fiber-reinforced thermoplastic polymer materials used to produce the coupons, and indicates composite carbon yields of the carbon fiber-reinforced thermoplastic polymer materials.

FIG. 4 shows the fractional weight loss versus time for the neat fiber and composite pellets of each of the polymer composite materials occurring during the TGA tests. The temperature program, plotted on the second y-axis with no symbol marker, deviates from the temperature program at the beginning and end of the nitrogen region. The furnace temperature at these times never reached 25° C. because of a delay in chamber cooling. This occurred for all the material tests but was thought not to influence results. The neat fibers showed a small weight loss of 1.6% during pyrolysis, suggesting a fiber char yield of 98.4%. The weight loss from the neat fiber test was assumed for the short fibers in each of the composite pellets. Substituting the neat fiber char yield, $Y_f$, and the composite pellet char yields, $Y_c$, from FIG. 4 into Equation 1 showed that all the polymer char yields, $Y_m$, were below 60%. This process is summarized in Table 2 of FIG. 5. Using Equation 1 on weight loss results from previous findings showed that the $Y_m$ values in Table 2 were consistent. PEI had the highest char yield of 54.1 and 56.9%, followed by PEEK which had a char yield of 50.6%. Char yield results for PPS varied between material suppliers, exhibiting yields of 42.9 and 49.1% or 33.9 and 44.9%. PESU and PSU had the relatively low char yields of 40.3% and 35.6%, respectively.

Since the carbon fibers were already carbonized prior to extrusion and were unaffected during thermoplastic polymer conversion to carbon, as the low weight loss showed, the onset of decomposition temperatures in FIGS. 4 and 5 reflected the polymer thermal stabilities. The onset temperature was defined as the intersection between the baseline and the tangent at the point of the highest slope for the weight fraction curve. Ranking the thermoplastic polymers based on their char yields, PEI>PEEK>PPS>PESU>PSU, suggested that, based on the char yields, PEI and PEEK would be better candidates as polymer precursors for carbon/carbon composite processing than PPS, PESU, and PSU.

Figure 6:
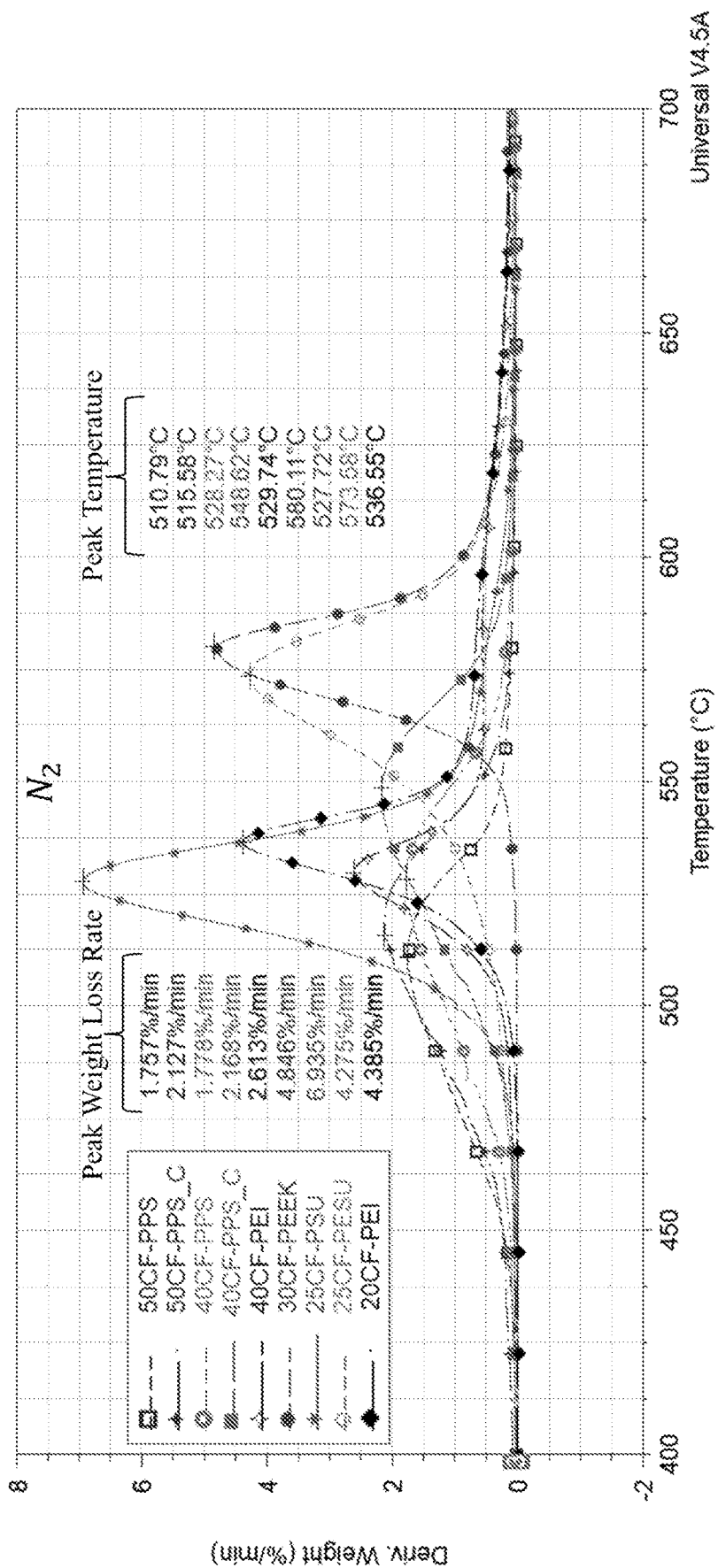
FIG. 6 contains a graph plotting fractional weight loss rate versus temperature showing peak weight loss rate and decomposition temperature at the peaks for the pellets of the carbon fiber-reinforced thermoplastic polymer materials.

FIG. 6 shows the fractional weight loss rates versus temperature for the composite pellets in FIG. 4. The shapes of these curves revealed autocatalytic behavior for all the thermoplastic polymers, accelerating to a maximum due to the production of gaseous byproducts acting as catalysts for subsequent chemical reactions and then decelerating as a result of depleting amounts of thermoplastic polymer converting to carbon. For the heating rate and temperature range tested, all of the thermoplastic polymers evaluated in the investigation demonstrated multi-step degradation kinetics, with only the PPS-based composite materials continuing to degrade from 750-900° C. The materials with the highest carbon fiber loadings (50CF-PPS, 50CF-PPS C, 40CF-PPS, 40CF-PPS C, 40CF-PEI) had the lowest peak weight loss rates due to a smaller starting amount of unreacted thermoplastic polymer compared to the other feedstock materials. Because of the law of mass action, the increase in carbon fiber loading from 20CF-PEI to 40CF-PEI had a suppressive effect on the degradation kinetics, shifting the curve down and to the left, lowering the peak weight loss rate and onset of decomposition temperature. This was also seen for 40CF-PPS and 50CF-PPS, as well as for 40CF-PPS C and 50CF-PPS C. The peak weight loss rate, however, was not in general proportional to the fiber loading, with 30CF-PEEK and 25CF-PSU having higher peak weight loss rates than 25CF-PESU and 20CF-PEI.

Compared to the polymer composite materials containing PSU, PEI, or PEEK, to the polymer composite materials containing PESU or PPS exhibited slower accelerations during degradation, with larger differences between their onset of decomposition temperature and peak temperature. The differences in degradation kinetics were partially attributed to different thermal stabilities for different functional groups in the thermoplastic polymers. Reported pyrolysis gas chromatography/mass spectrometry (Py-GC/MS) analysis on variations of PPS, PEEK, PESU/PSU, and PEI showed that the most abundant pyrolysis products during initial degradation were $H_2S$ and benzenethiol, $CO+CO_2$ and phenol, $SO_2$ and phenol, and $CO+CO_2$ and phenol+benzonitrile, due to thermally unstable sulfide groups, ether and carbonyl groups, sulfone and ether groups, and imide, isopropylene, and ether groups, respectively. Such reports have observed that decomposition mechanisms responsible for the evolution of gaseous by-products detected were depolymerization from thermally unstable chain ends and chain branches at lower decomposition temperatures followed by random main chain scission of unstable carbonized residue at higher temperatures, promoting the release of additional moieties and the recombination of adjacent radicals. Other mechanisms may have been responsible for differences in degradation kinetics and char yields in these feedstock materials however, because of possible additives (i.e., stabilizers and plasticizers) contained in the thermoplastic polymers to modify their thermal and rheological properties for extrusion.

The results of the pyrolysis tests performed on the coupons showed that as the heating rate was decreased, the distortion of all materials decreased. The distortion for all the coupons was justifiably less along the print direction due to the predominant alignment of carbon fibers in this direction and the resulting low coefficient of thermal expansion. All the coupons were placed on the crucible such that print direction was parallel to the 1-direction (see FIG. 3), except for 20CF-PEI which was accidentally rotated 90° and had its print direction parallel to the 3-direction. The coupons for 50CF-PPS C and 40CF-PPS C were not tested since 50CF-PPS and 40CF-PPS had higher char yields.

For the same heating rate, polymer degradation distinctly varied between the polymer composite materials. Despite having similar carbon fiber loadings, 25CF-PSU and 20CF-PEI degraded into a foam structure at 5° C./min while 25CF-PESU swelled with no visible porosity. The foamability of thermoplastic polymers has been shown to depend on several factors, including their rheological and morphological characteristics. Higher extensional and shear viscosities have been observed to reduce foamability by increasing the polymer melt strength, suppressing bubble coalescence/growth as well as the loss of gas from the thermoplastic polymer to its surroundings. The stability of bubbles that comprise the foam structure has been observed to be influenced by fillers, which when present in higher quantities can lower the volumetric expansion ratio (ratio of nonfoam material density to foam density) and physically slow desorption. Both 25CF-PSU and 20CF-PEI had highly, visibly porous surfaces, indicating that the polymer melt viscosities and their enhancement via fiber loadings were sufficiently high to promote a moderate cell density but not sufficiently high to provide cell stabilization and prevent dimensionally unstable cell coalescence/growth during degradation. The foamability of PESU, which was evaluated with a relatively low 25 wt. % fiber loading (25CF-PESU), appeared to have been affected by a slower production rate of volatile species (FIG. 6), with slower desorption/bubble growth possibly decelerating scission-induced stress relaxation and causing swelling. The weight loss was characterized for all the coupons and was in close agreement with the thermogravimetric results of the composite pellets. Although the TGA results indicated that PEI and PEEK were the best thermoplastic polymer precursors due to their high char yields, the coupon distortion results showed that 50CF-PPS was the most dimensionally stable. At 1° C./min, 50CF-PPS exhibited very little distortion, indicating this material and this heating rate as a potential processing route for carbon/carbon composite manufacturing.

PEI would appear to be a viable candidate for manufacturing C/C composites because of its superior char yield. However, the dimensional stability of 20CF-PEI was viewed as being inadequate for manufacturing structural C/C shapes. From testing it was not clear whether the dimensional stability of 20CF-PEI was lower than 50CF-PPS because of the fiber loading or because of the thermoplastic polymer. To better assess the stability between PPS and PEI, the carbon fiber loading was fixed at 40 wt. %. PEI had larger average carbonized strains than PPS in the 1-3 plane for the same fiber loading, fiber orientation, and heating rate, further encouraging the use of 50CF-PPS for shape- and size-preserving pyrolysis processing of more complex geometries. Notably, 40CF-PEI did not foam like 20CF-PEI did at higher heating rates, reflecting the suppressive effects of fiber loading on degradation kinetics and the fiber loading influence on rheology and cell stabilization during pyrolysis. Larger distortions of 40CF-PEI relative to 50CF-PPS suggested the need for PEI with fiber loadings >40 wt. % to continue improving the dimensional stability and viability of additively manufactured PEI-based composite preforms for C/C composite processing.

As summarized in Table 3 of FIG. 7, coupon densities were also found to vary with heating rate, with increased densities being observed at slower heating rates as a result of lower thermal expansions. Since the distortion of the coupons was highly anisotropic, three measurements along each coordinate axis were taken to calculate the volume and subsequently, density after pyrolysis.

Figure 8:
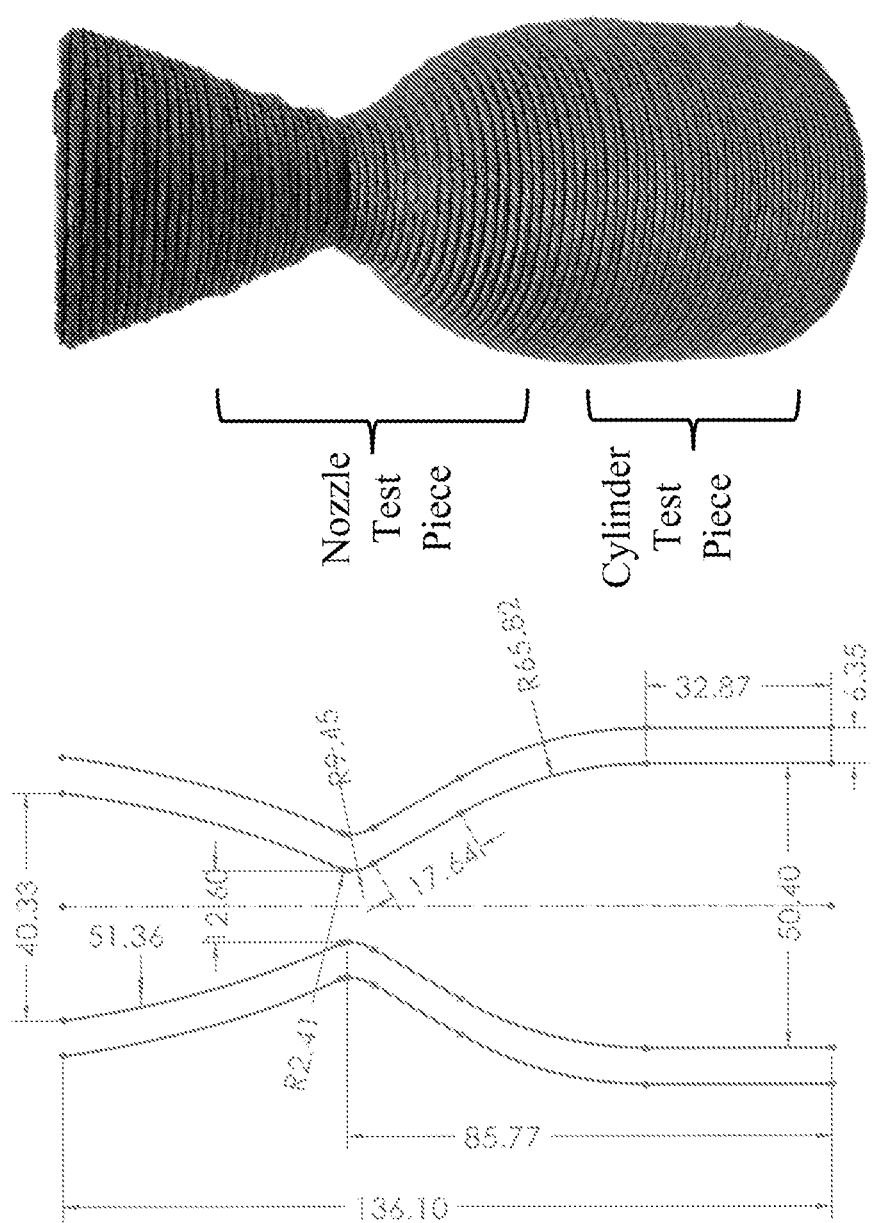
FIG. 8 contains a drawing (left) and an image (right) of a CD nozzle preform produced by the experimental 3D printing operation from one of the carbon fiber-reinforced thermoplastic polymer materials.

Because of the promising results from the coupon distortion tests, a preform was printed and carbonized to form a structure having a more complex geometry than the panel of FIG. 3 with the intent to determine if the size and shape of the preform could be preserved during pyrolysis. The structure chosen was a converging-diverging (CD) nozzle whose 3D-printed preform is depicted in FIG. 8. The CD nozzle preform was additively manufactured using 50CF-PPS. To fabricate the preform, the system parameters of the extrusion deposition system used for 3D printing were the same as those used to 3D print the 50CF-PPS coupons, except the 4 mm diameter extruder nozzle followed a spiral print path with an extruder nozzle speed of about 1500 mm/min. The bead dimensions were kept at 6.15 mm×1.5 mm and the print bed was heated to about 120° C. to minimize residual stresses in the nozzle preform. Since the 92.075 mm inner diameter of the tube furnace was too small to carbonize the entire geometry, the CD nozzle was cut into two pieces—cylinder test piece and a nozzle test piece as represented in FIG. 8.

Ramping at about 0.5° C./min from about 25° C. to about 900° C. in a nitrogen atmosphere, a set of test pieces were carbonized with mineral wool insulation as removable internal support to ensure the general shape of the test pieces was conserved during pyrolysis. The spiral print path used to 3D print the test pieces meant the height of each layer varied continuously along the circumferential direction, which was considered a source of structural instability. The cylindrical test piece had a height of 42.6 mm, which was larger than the 32.9 mm straight section specified in its CAD model, explaining the converging behavior of the top layers after pyrolysis. Due to the insulation, however, cracks formed in the top layers of the cylinder test piece due to the inner surface being partially constrained from freely expanding inwards. Although the carbonized test pieces deviated from their printed geometry, the results evidenced how the EDAM process could be modified to design against distortion, for example, with the use of a less anisotropic fiber orientation distribution, for example, accomplished locally either by increasing the extrusion width and/or modifying the geometry (i.e., convergence zone) of the extruder nozzle, or globally by alternating infill patterns between layers. The results, nevertheless, showed that complex-shaped C/C composites could be manufactured via extrusion deposition additive manufacturing.

The char yield and coupon distortion results suggested that extrusion deposition additive manufacturing (EDAM) of thermoplastic-based composites can be practical for manufacturing complex-shaped C/C composites. Although thermogravimetric analyses of the evaluated polymer composite materials indicated that PEI had the highest char yield, the coupon distortion tests showed that for the same fiber orientation, heating rate, and fiber loading, PPS was more dimensionally stable during pyrolysis. At 1° C./min, 50CF-PPS exhibited very little distortion, indicating this material and this heating rate as a potential processing route for C/C composite manufacturing. Because of the promising results from the coupon distortion tests, a preform with a more complex geometry was additively manufactured using 50CF-PPS. Ramping at 0.5° C./min from 25° C. to 900° C., the distortion results for a converging-diverging nozzle preform demonstrated that more complex shapes could be transformed into C/C composites without significantly changing the 3D printed shape. Although removable internal support can be used to preserve shapes of more complex geometries, modifying the fiber orientation by either local or global means has the potential of eliminating the need for a removable internal support.

The results also provided the basis for improvements in the manufacturing process of complex-shaped cost-competitive C/C parts with small dimensional tolerances via EDAM. All thermoplastic polymers tested during the investigation had char yields of less than 60%, much less than some commercially used thermosetting resins (e.g., greater than 85%). Therefore, densification will influence the cost of EDAM C/C composites and, in the absence of higher char-yielding thermoplastic polymers, the EDAM process would likely benefit from infiltrating the composite with a higher char-yielding polymer and performing a second pyrolysis step to convert the higher char-yielding polymer to carbon. The ability to orient short fibers and locally modify crack deflection paths for increased fracture toughness, for example, of a carbonized matrix microstructure is a potential benefit of EDAM. The ability to produce 3D printed preforms with continuous or hybrid (continuous+discontinuous) fiber reinforcement should enhance the ability of meeting strength demands for hypersonic and other high-temperature applications. As such, though short carbon fibers were employed in the polymer composite materials, it is within the scope of the invention to utilize discontinuous, continuous, or a combination of continuous and discontinuous fibers.

As previously noted above, though the foregoing detailed description describes certain aspects of one or more particular embodiments of the invention and investigations associated with the invention, alternatives could be adopted by one skilled in the art. For example, preforms could be fabricated that differ in appearance and construction from the embodiments described herein, process parameters could be modified, and appropriate materials could be substituted for those tested, for example, high char-yielding polymers such as polyarylacetylene (PAA) and bis-ortho-diynylarene (BODA). As such, and again as was previously noted, it should be understood that the invention is not necessarily limited to any embodiment described herein or illustrated in the drawings.

The invention claimed is:

1. A method for manufacturing a carbon/carbon composite, the method comprising:
   extruding a polymer composite material using an extrusion deposition additive manufacturing process to form a preform, wherein the polymer composite material comprises a thermoplastic polymer reinforced with carbon fibers; and
   heating the preform via pyrolysis to form the carbon/carbon composite; and
   preserving a shape of the preform with a removable internal support during the step of heating.

2. The method of claim 1, wherein the extruding comprises orienting the fibers along a print direction of a nozzle of a 3D printer via shear flow.

3. The method of claim 2, wherein the thermoplastic polymer has a char yield of less than 60%.

4. The method of claim 3, wherein the thermoplastic polymer has a char yield of greater than 30%.

5. The method of claim 3, wherein the thermoplastic polymer has a char yield of greater than 40%.

6. The method of claim 3, further comprising infiltrating the carbon/carbon composite with a second polymer having a higher char-yield than the thermoplastic polymer and performing a pyrolysis step to convert the second polymer to carbon.

7. The method of claim 2, wherein the carbon fibers are discontinuous.

8. The method of claim 2, wherein the carbon fibers comprise fibers that are continuous or a combination of continuous and discontinuous.

9. The method of claim 2, wherein the thermoplastic polymer comprises at least one of polyphenylene sulfide (PPS), polyetheretherketone (PEEK), and polyetherimide (PEI), poly sulfone (PSU), polyether sulfone (PESU), polyarylacetylene (PAA), and bis-ortho-diynylarene (BODA).

10. The method of claim 9, wherein the carbon fiber by weight of the polymer composite material is 20% and 50%.

11. The method of claim 9, wherein the carbon fiber by weight of the polymer composite material is 25% and 50%.

12. The method of claim 9, wherein the carbon fiber by weight of the polymer composite material is 40% and 50%.

13. The method of claim 2, wherein the thermoplastic polymer comprises polyphenylene sulfide (PPS).

14. The method of claim 13, wherein the carbon fiber by weight of the polymer composite material is 40% and 50%.

15. The method of claim 1, internal support is mineral wool.

16. The method of claim 1, wherein heating the preform comprises heating the preform at a rate of 0.5° C./min to 5° C./min.

17. The method of claim 1, wherein heating the preform comprises heating the preform at a rate of 0.5° C./min to 1° C./min.

18. The method of claim 1, wherein the extruding of the polymer composite material comprises forming the preform layer by layer.

19. The method of claim 18, wherein the extruding of the polymer composite material further comprises extruding alternating infill patterns between the layers.

20. The method of claim 18, wherein the extruding of the polymer composite material further comprises controlling orientations of fibers within the layers as the polymer composite material is extruded with a nozzle of an extruder.

* * * * *